(12) United States Patent
Schneegaβ et al.

(10) Patent No.: US 8,447,706 B2
(45) Date of Patent: May 21, 2013

(54) METHOD FOR COMPUTER-AIDED CONTROL AND/OR REGULATION USING TWO NEURAL NETWORKS WHEREIN THE SECOND NEURAL NETWORK MODELS A QUALITY FUNCTION AND CAN BE USED TO CONTROL A GAS TURBINE

(75) Inventors: Daniel Schneegaβ, Amsterdam (NL); Steffen Udluft, Eichenau (DE)

(73) Assignee: Siemens Aktiengesellschaft, München (DE)

( * ) Notice: Subject to any disclaimer, the term of this patent is extended or adjusted under 35 U.S.C. 154(b) by 518 days.

(21) Appl. No.: 12/675,555

(22) PCT Filed: Aug. 26, 2008

(86) PCT No.: PCT/EP2008/061115
§ 371 (c)(1),
(2), (4) Date: Feb. 26, 2010

(87) PCT Pub. No.: WO2009/033944
PCT Pub. Date: Mar. 19, 2009

(65) Prior Publication Data
US 2010/0205974 A1   Aug. 19, 2010

(30) Foreign Application Priority Data

Sep. 6, 2007   (DE) .......................... 10 2007 042 440

(51) Int. Cl.
*G06F 11/00* (2006.01)
(52) U.S. Cl.
USPC ......................................................... 706/12
(58) Field of Classification Search
USPC .............................................. 706/12, 45, 62
See application file for complete search history.

(56) References Cited

U.S. PATENT DOCUMENTS

| | | | |
|---|---|---|---|
| 5,434,951 A * | 7/1995 | Kuwata ........................... | 706/28 |
| 5,857,321 A | 1/1999 | Ashley | |
| 6,169,981 B1 * | 1/2001 | Werbos ........................... | 706/23 |
| 6,882,992 B1 | 4/2005 | Werbos | |
| 2002/0016665 A1 * | 2/2002 | Ulyanov et al. ............... | 701/106 |

FOREIGN PATENT DOCUMENTS

| | | |
|---|---|---|
| DE | 69917711 T2 | 6/2005 |
| DE | 102007017259 | 10/2008 |
| EP | 0936351 A2 | 8/1999 |
| JP | 2007065929 A | 3/2007 |
| WO | WO 2005081076 A2 | 9/2005 |

OTHER PUBLICATIONS

Antos, Andras et al.; "Learning near-optimal policies with bellman-residual minimization based fitted policy iteration and a single sample path" In: Proc. of the Conference on Learning Theory, 2006; pp. 574-588.

(Continued)

*Primary Examiner* — David Vincent

(57) ABSTRACT

A method for a computer-aided control of a technical system is provided. The method involves use of a cooperative learning method and artificial neural networks. In this context, feed-forward networks are linked to one another such that the architecture as a whole meets an optimality criterion. The network approximates the rewards observed to the expected rewards as an appraiser. In this way, exclusively observations which have actually been made are used in optimum fashion to determine a quality function. In the network, the optimum action in respect of the quality function is modeled by a neural network, the neural network supplying the optimum action selection rule for the given control problem. The method is specifically used to control a gas turbine.

20 Claims, 2 Drawing Sheets

OTHER PUBLICATIONS

Schneegass, D. et al., "Neural Rewards Regression for Near-optimal Policy Identification in Markovian and Partial Observable Environments", in: Verleysen. M. Proc. of the ESANN, 2007; pp. 301-306.

Bram Bakker; "Reinforcement Learing by Backpropagation through an LSTM Model/Critic"; IEEE International Symposium on Approximate Dynamic programming and Reinforcement learning, Apr. 2007, pp. 127-134, XP031095237.

Venayagamoorthy G K et al: "Adaptive Critic Designs for Optimal Control of Power Systems" Intelligent Systems Application to Power Systems, International Conference on, Proceedings of the 13th Nov. 6-10, 2005 Piscataway, NJ, USA, IEEE, Nov. 6, 2005, pp. 136-148, XP010897199.

Mohagheghi, Salman et al: "Making the Power Grid more intelligent" Bulk Power System Dynamics and Control—VII. Revitalizing Operational Reliability, 2007 IREP Symposium, IEEE, PI, 1. Aug. 2007, pp. 1-10, XP031195591.

Schneegass, Daniel et al: "Improving Optimality of neural rewards Regression for Data-Efficient Batch Near-Optimal Policy Identification" Artificial Neural Networks âICANN 2007; (Lecture notes in computer science), Springer Berlin Heidelberg, vol. 4668, 9. Sep. 2007, pp. 109-118, XP019069348.

Riedmiller, Martin: "Neural Fitted Q Iteration—First Experiences with a Data Efficient Neural Reinforcement Learning Method". ECML 2005: pp. 317-328.

Eiji Uchibe et al.: "Reinforcement learning under constraints generated by multiple reward functions", IEICE Technical Report, the Institute of Electronics, Information and Communication Engineers, Jun. 9, 2006, vol. 106, No. 102, pp. 1-6; Magazine.

Sachiyo Arai, "Multiagent Reinforcement Learning Frameworks: Steps toward Practical Use"Journal of the Japanese Society for Artificial Intelligence, the Japanese Society for Artificial Intelligence, Jul. 1, 2001, vol. 16, No. 4, pp. 476-481; Magazine.

* cited by examiner

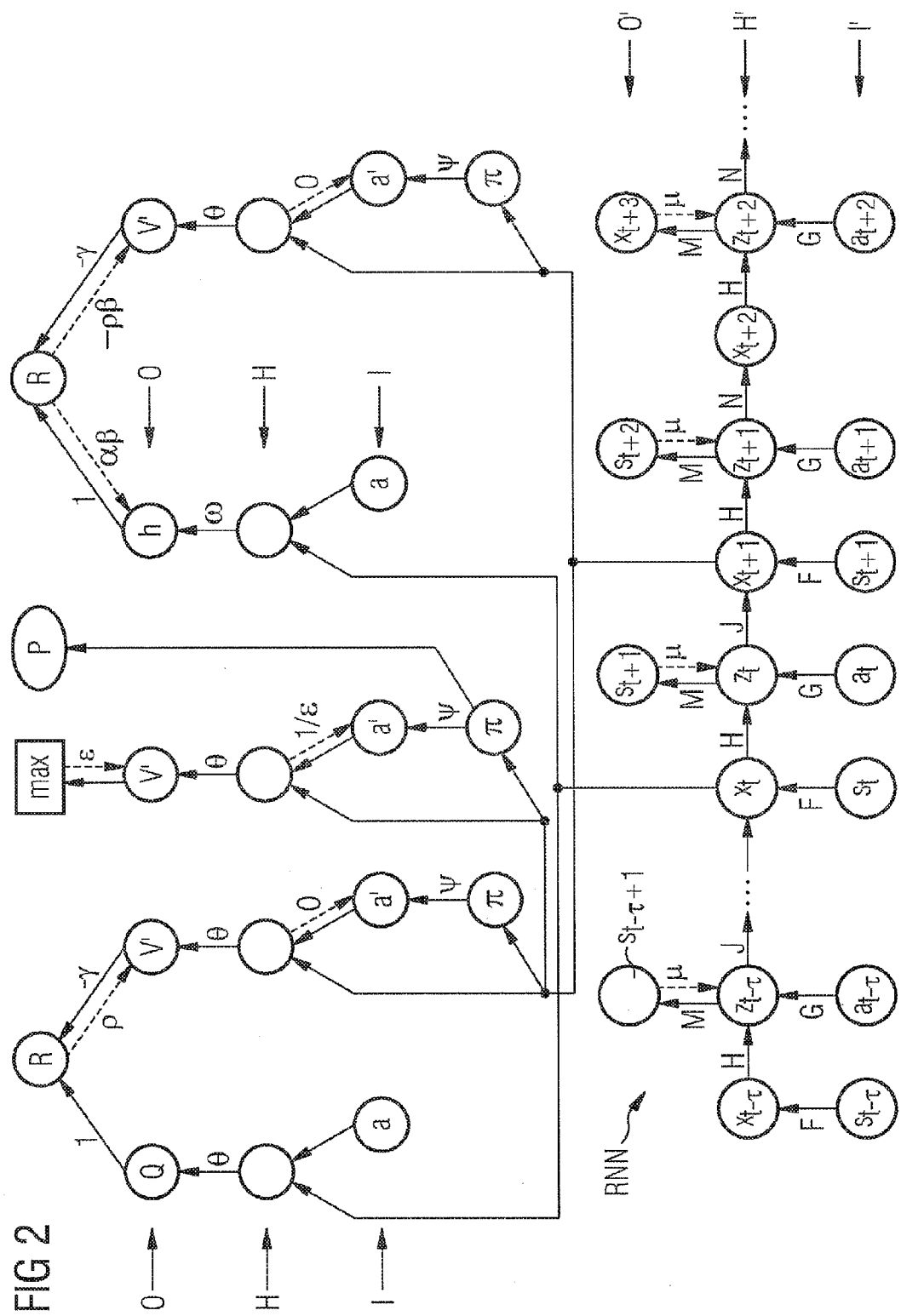

METHOD FOR COMPUTER-AIDED CONTROL AND/OR REGULATION USING TWO NEURAL NETWORKS WHEREIN THE SECOND NEURAL NETWORK MODELS A QUALITY FUNCTION AND CAN BE USED TO CONTROL A GAS TURBINE

CROSS REFERENCE TO RELATED APPLICATIONS

This application is the US National Stage of International Application No. PCT/EP2008/061115 filed Aug. 26, 2008, and claims the benefit thereof. The International Application claims the benefits of German Application No. 10 2007 042 440.1 DE filed Sep. 6, 2007. All of the applications are incorporated by reference herein in their entirety.

FIELD OF INVENTION

The invention relates to a method for computer-aided control and/or regulation of a technical system and a corresponding computer program product.

SUMMARY OF INVENTION

When controlling complex technical systems it is often desirable to select the actions to be carried out on the technical system in such a manner that an advantageous desired dynamic behavior of the technical system is achieved. The dynamic behavior is however often not simple to predict in the case of complex technical systems, so corresponding computer-aided prediction methods are required, to estimate the future behavior of the technical system and to select appropriate actions for regulating or controlling the technical system correspondingly.

The control of technical systems today is frequently based on expert knowledge, in other words automatic regulation of the system is established on the basis of such expert knowledge. However approaches are also known, with which technical systems are controlled with the aid of known methods for what is known as reinforcement learning. The known methods cannot however be applied generally to any technical systems and often do not furnish sufficiently good results.

An object of the invention is to create a method for computer-aided control and/or regulation of a technical system, which can be applied generally to any technical systems and furnishes good results.

In the inventive method the dynamic behavior of a technical system is observed for a number of time points, with the dynamic behavior for each time point being characterized by a state of the technical system and an action carried out on the technical system, a respective action at a respective time point resulting in a sequential state of the technical system at the next time point.

In order to achieve optimum control or regulation of the technical system, an action selection rule is learned based on data records, each data record comprising the state of the technical system at a respective time point, the action carried out in the time point and the sequential state and an evaluation being assigned to each data record.

A state of the technical system here is in particular a state vector with one or more variables, the variables being for example observed state variables of the technical system. Similarly an action to be carried out on the technical system can also consist of a corresponding vector with a number of action variables, the action variables in particular representing adjustable parameters on the technical system.

The inventive method is characterized by a specific variant of the learning of the action selection rule, comprising the following steps:
i) modeling of a quality function by a first neural network comprising the states and actions of the technical system as parameters;
ii) learning the first neural network based on an optimality criterion, which is a function of the evaluations of the data records and the quality function, an optimum action in respect of the quality function being modeled by a second neural network, which is learned based on the quality function.

With such a method an optimum action selection rule is determined in a simple and effective manner by appropriate learning of the first and second neural networks, said action selection rule being a function of evaluations of the data records, the action selection rule being embodied such that the action with the best evaluation is selected where possible in a state. The actual regulation or control of the technical system then takes place with the learned action selection rule in that actions to be carried out on the technical system are selected with the learned action selection rule based on the learned second neural network. The inventive method has been verified based on test data records and it has proved that very good results are achieved with the method.

The inventive method represents an extension of the method described in document [1], the document [1] being a German patent application submitted by the same applicant as the present application. The general content of this document is established by reference to the content of the present application. Compared with the method in document [1], the method according to the present invention has the advantage that a second neural network is used, which learns the optimum action based on the quality function, so that the action selection rule learned with the method is defined in a simple manner by a learned second neural network, with which, based on a state of the technical system, the optimum action in said state can be calculated. The method is thus not restricted to discrete actions but the second neural network can in particular also model continuous actions. The inventive method also allows data efficiency to be increased, in other words good results for the appropriate control or regulation of the technical system can be achieved based on an optimality criterion even with a smaller number of data records.

In one preferred embodiment of the inventive method the quality function is modeled by the first neural network such that an evaluation function is tailored to the evaluations of the data records.

In a further embodiment of the inventive method the optimum action in respect of the quality function, which is modeled by the second neural network, is determined such that the optimum action maximizes the quality function.

In a particularly preferred embodiment of the inventive method the first neural network forms a feed-forward network with an input layer comprising a respective state of the technical system and the action that can be carried out in the respective state, one or more hidden layers and an output layer comprising the quality function. Similarly the second neural network is preferably also embodied as a feed-forward network, this feed-forward network comprising the following layers:
an input layer comprising a respective sequential state of the technical system;
one or more hidden layers with hidden variables;
an output layer comprising the optimum action in the sequential state in respect of the quality function.

The abovementioned feed-forward networks are also referred to as multilayer perceptrons and are sufficiently known structures of artificial neural networks from the prior art.

The backpropagation method known sufficiently from the prior art is preferably used in the inventive method to learn the first and/or second neural network.

The optimality criterion can be selected differently in the inventive method, with the optimality criterion that parameterizes an optimum dynamic behavior of the technical system preferably being used. Possible optimality criteria are for example the minimization of the Bellman residual or the reaching of the fixed point of the Bellman iteration. The Bellman residual and the Bellman iteration are known to the person skilled in the art in the field of reinforcement learning) and are therefore not explained further here.

Instead of or in addition to the Bellman residual and the reaching of the fixed point of the Bellman equation, the minimization of a modified Bellman residual can also be used as an optimality criterion, the modified Bellman residual comprising an auxiliary function, which is a function of the respective state of the technical system and the actions that can be carried out in the respective state. One possible embodiment of this Bellman residual is described in the detailed description of the application. The modified Bellman residual is referred to there as $L_{aux}$. In order to use this modified Bellman residual in the inventive method, the auxiliary function is preferably modeled by a third neural network, which is learned on the basis of the optimality criterion, the third neural network forming a feed-forward network with an input layer comprising a respective state of the technical system and the action that can be carried out in the respective state, one or more hidden layers and an output later comprising the auxiliary function. In the inventive method the learning of this third neural network takes place in parallel with the learning of the first and second neural networks.

In a particularly preferred embodiment of the inventive method the optimality criterion comprises an adjustable parameter, the change in which causes the optimality criterion to be adapted. This provides a flexible means of tailoring the inventive method to the most appropriate optimality criterion for the predetermined data record.

In a further embodiment of the inventive method the history of past states and actions of the technical system can be taken into account appropriately. This is achieved in that the states in the data records are hidden states of the technical system, which are generated by a recurrent neural network with the aid of source data records, the source data records respectively comprising an observed state of the technical system, an action carried out in the observed state and the resulting sequential state. The dynamic behavior of the technical system in particular is modeled with the recurrent neural network, the recurrent neural network being formed by at least one input layer comprising the observed states of the technical system and the actions carried out on the technical system, at least one hidden recurrent layer comprising the hidden states of the technical system and at least one output layer comprising the observed states of the technical system. The recurrent neural network is in turn learned using an appropriate learning method, in particular also using the known backpropagation method.

Any technical systems can be controlled and regulated using the inventive method but a preferred area of application is turbines, in particular gas turbines. When controlling or regulating a gas turbine the states of the technical system and/or the actions that can be carried out in the respective states are one or more of the following variables: gross output of the gas turbine; one or more pressures and/or temperatures in the gas turbine or in the area around the gas turbine; combustion chamber accelerations in the gas turbine; one or more adjustment parameters in the gas turbine, in particular valve settings and/or fuel ratios and/or preliminary vane positions.

As well as the method described above the invention also relates to a computer program product with a program code stored on a machine-readable medium for implementing the inventive method when the program is running on a computer.

BRIEF DESCRIPTION OF THE DRAWINGS

Exemplary embodiments of the invention are described in detail below with reference to the accompanying Figures, in which:

FIG. 2 shows a schematic diagram of a second embodiment of the inventive method.

DETAILED DESCRIPTION OF INVENTION

Figure 1:
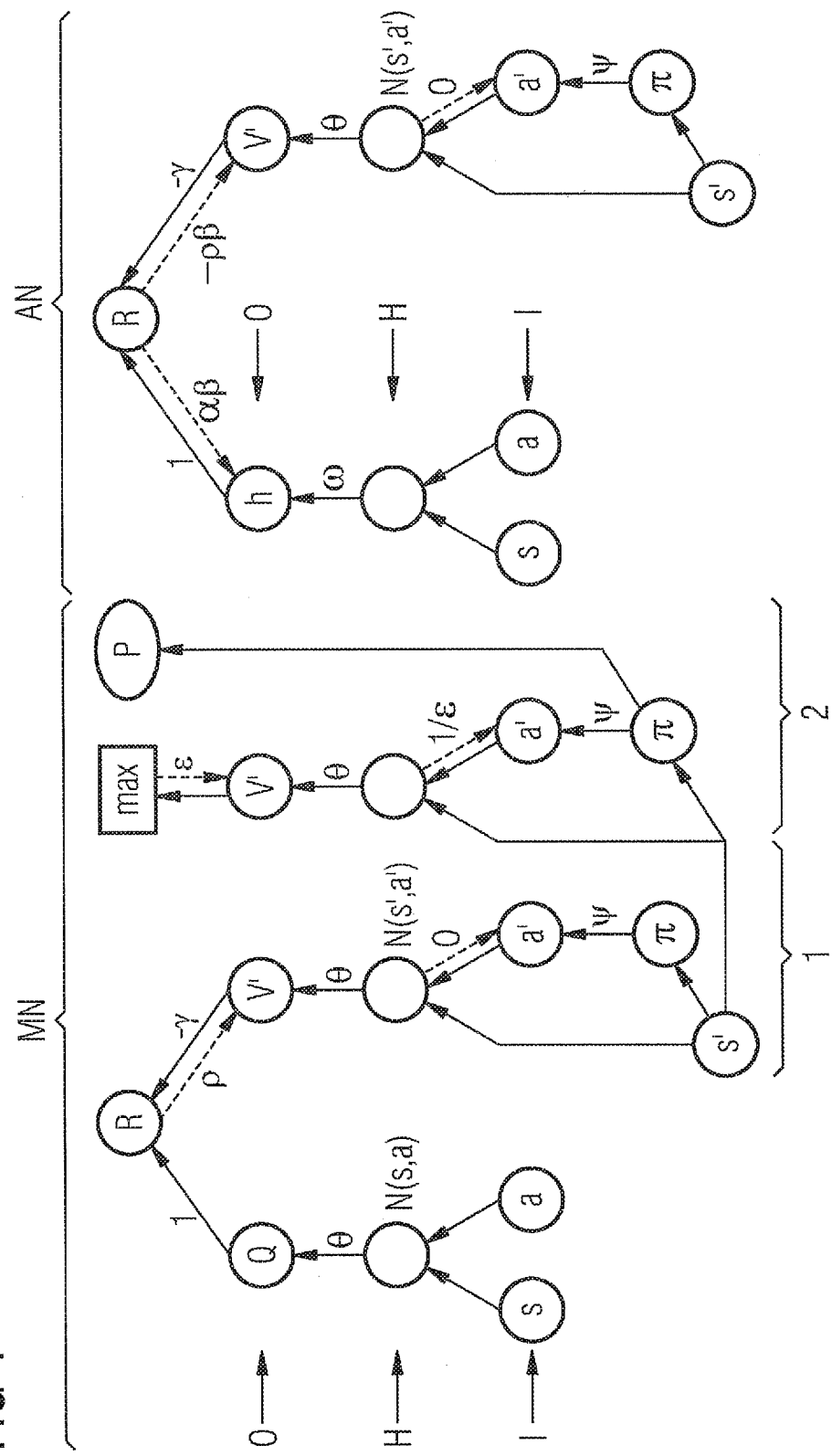
FIG. 1 shows a schematic diagram of a first embodiment of the inventive method.

The embodiments of the inventive method described below are based on a set of data records, which were observed, i.e. measured or determined by experiment, for any technical system. One particularly preferred application of a technical system here is the control of a gas turbine, for which data in the form of state variables of the turbine is present, for example the gross output of the gas turbine, one or more pressures and/or temperatures in the gas turbine, combustion chamber accelerations and the like. Data records relating to a plurality of successive time points are present here, each data record being characterized by a state, which is generally a state vector with a number of state variables, by an action, which represents the change in state variables or other adjustable parameters of the technical system, and by a sequential state, which shows the values of the state variables after the action has been carried out. Also present for each data record is an evaluation or reward, showing the quality of the action at the respective time point for the control of the technical system. The evaluation here is preferably embodied such that the best or optimum control of the technical system is achieved by actions with high evaluations or rewards at the various time points during operation of the technical system.

In the embodiments of the inventive method described below an action selection rule is learned based on the observed data records of the technical system using a reinforcement learning method, it being possible for the technical system then to be operated appropriately with said action selection rule. The action selection rule here indicates for a state of the technical system, which is the best action to be carried out in this state. The technical system here is considered as a stochastic dynamic system, the reinforcement learning method for determining the action selection rule being considered to be a regression task, in which a reward function is tailored to the observed data records.

In the learning method described below a search is carried out for the learning selection method, which can be used optimally to control the technical system. The states, actions and sequential states are considered mathematically here as observations of what is known as a Markov decision process. A Markov decision process is generally defined by a state space S, a set of actions A, which can be selected in the various states, and the dynamic, which is considered as a transition probability distribution $P_T: S \times A \times S \to [0,1]$, which is a function of the instantaneous state s, the selected action a and the sequential state s'. The transition from a state to the sequential state is characterized by what are known as rewards R(s,a,s'), which are functions of the instantaneous state, the action and the sequential state. The rewards are defined by a reward probability distribution $P_R$ with the expected value of the reward $$ER = \int_R r P_R(s, a, s', r) dr, s, s' \in S, a \in A.$$

According to the embodiment of the inventive method described below a search is carried out for the maximum of a discounting Q function, which corresponds to the quality function within the meaning of the claims and is defined as follows by the Bellman equation, which is known sufficiently from the prior art:

$$Q^\pi(s,a) = E_s(R(s,a,s') + \gamma Q^\pi(s',\pi(s'))) \quad (1).$$

Maximization here takes place in the so-called rule space $\Pi = (S \to A)$ across all possible states s and actions a, where $0 < \gamma < 1$ is the discounting factor, s' the sequential state of s and $\pi \in \Pi$ the action selection rule used. Maximization is carried out according to the invention described here using a regression method based on neural networks, said regression method using a gradient based on the optimum action selection rule (i.e. on the selection rule that maximizes the Q function) and is also referred to as Policy Gradient Neural Rewards Regression. There is no search here—as in the method according to document [1]—specifically for discrete actions, which maximize the quality function. Instead the action already assumed to be optimum beforehand is used as the input for the Q function, the optimum action being calculated based on a neural feed-forward network. The architecture of the method used is shown in FIG. 1 and is described in more detail below.

In the embodiments of the inventive method described below a technical system is considered, in which both the states of the system and also the actions that can be carried out in a respective system are continuous. The dynamic of the system is probabilistic here.

In the embodiments in FIG. 1 and FIG. 2 the Q function described above is described by an individual feed-forward network or multilayer perceptron $N(s,a) = Q(s,a)$, comprising an input layer I with the state s and the action a, a hidden layer H and an output layer O with the quality function Q. The backpropagation algorithm known sufficiently from the prior art is used to model the reward function according to equation (1), the optimization problem being resolved by minimizing a modified (quadratic) Bellman residual across all l observed transitions. l is thus the number of data records in the observed data of the technical system. The modified Bellman residual used in the embodiment described here is based on the publication [2] and is a better approximation of the true Bellman residual. It is also referred to below as the auxiliary residual $L_{aux}$ and is as follows:

$$L_{aux} = L - \hat{L} + \Omega(\theta) = \quad (2)$$

$$= \sum_{i=1}^{l} (Q(s_i, a_i) - \gamma Q(s_{i+1}, \pi(s_{i+1})) - r_i)^2 -$$

-continued $$\sum_{i=1}^{l} (h(s_i, a_i) - \gamma Q(s_{i+1}, \pi(s_{i+1})) - r_i)^2 + \Omega(\theta)$$

Here θ represents the parameters of the artificial neural feed-forward network N(s,a) and in particular comprises the weighting matrices between the individual neuron layers in the feed-forward network. Ω is an appropriate regularization term. $r_i$ represents the observed reward or evaluation in a state $s_i$ from the data records, and $s_{i+1}$ are unbiased appraisers of the state variables of the sequential state.

It is known that minimization of the Bellman residual on the one hand has the advantage that it represents a readily controllable learning problem, as it is related to the monitored learning system. On the other hand minimization of the Bellman residual tends to minimize higher-order terms of the discounted sum of future rewards in the stochastic instance, if no further uncorrelated data records can be defined for each transition. Generally the solutions for Q functions that are smoother for sequential states of the stochastic transitions are subject to prejudice. If $s_{i+1}$ and $r_i$ are unbiased estimates of subsequent states or rewards, the expression $(Q(s_i, a_i) - \gamma V(s_{i+1}) - r_i)^2$ is not an unbiased estimation of the true quadratic Bellman residual $(Q(s,a) - (TQ)(s,a))^2$, but of $(Q(s,a) - (TQ)(s,a))^2 + (T'Q)(s,a)^2$. T and T' are defined here as follows:

$$(T,Q)(s,a) = E_s(R(s,a,s') + \gamma \max_a Q(s',a'))$$

$$(T'Q)(s,a)^2 = Var_s(R(s,a,s') + \gamma \max_a Q(s',a'))$$

T is also referred to as the Bellman operator.

As an alternative to using double trajectories, the above modified Bellman residual from document [2] is used as a better approximation of the true Bellman residual. The optimization task is thus the solution $$\hat{Q} = \operatorname{argmin}_{Q \in H_Q} \max_{h \in H_h} L_{aux}.$$

The idea of the modified Bellman residual is to find an h, which approximates the Bellman operator across the observations.

This gives:

$$Z = E_{s'}(Q(s, a) - \gamma V(s') - R(s, a, s'))^2 -$$

$$E_{s'}(h(s, a) - \gamma V(s') - R(s, a, s'))^2$$

$$= (Q(s, a) - (TQ)(s, a))^2 - Err(h(s, a), (TQ)(s, a)).$$

This is the true loss function with an additional error term due to the suboptimal approximation of h, if $H_h$ is not able to approximate the Bellman operator with any degree of accuracy.

This technique allows the true Bellman residual to be limited upward, if the error of h in respect of TQ can be limited. It is easy to see that $\hat{L} \leq L$ applies within a saddle point of $L_{aux}$, if $H_Q = H_h$. Otherwise h would not give the minimum of $\hat{L}$. An optimum of $L_{aux}$ would therefore be provided by any fixed point of the Bellman iteration, if such a point exists, as only in this instance can Q approximate the Bellman operator as well as h and $L_{aux} = 0$. In contrast to the proposal in the publication [2] in the embodiment of the invention described here $H_h$ was either selected to be a much more powerful function class than $H_Q$ or taking into account prior knowledge of the true Bellman operator, so that $\hat{L}$ essentially provides a better estimation of $T'Q^2$. Since such an estimation of the variance is not always unbiased, the method converges on a not unbiased appraiser of the true Bellman residual, which only minimizes the function $\hat{Q}^* \epsilon H_Q$ within the function space but clearly provides a better approximation than appraisers known from the prior art.

The following gradients $\Delta\theta$, $\Delta\omega$ and $\Delta\psi$ result from the above Bellman residual $L_{aux}$ according to equation (2), representing derivations of the residual $L_{aux}$ according to $\theta$, $\omega$ and/or $\psi$, their zero position having to be determined to achieve the optimization task:

$$\Delta\theta = \sum_{i=1}^{l}\left((Q(s_i,a_i) - \gamma Q(s_{i+1},\pi(s_{i+1})) - r_i)\cdot \frac{d}{d\theta}\right. \tag{3}$$

$$(Q(s_i,a_i) - \rho\gamma Q(s_{i+1},\pi(s_{i+1}))) -$$

$$\frac{\epsilon d}{d\theta}Q(s_{i+1},\pi(s_{i+1})) + \beta\rho\gamma(h(s_i,a_i) - \gamma Q(s_{i+1},\pi(s_{i+1})) - r_i)$$

$$\left.\frac{d}{d\theta}Q(s_{i+1},\pi(s_{i+1}))\right) + \frac{d\Omega(\theta)}{d\theta}$$

$$\Delta\omega = \alpha\beta\sum_{i=1}^{l}(h(s_i,a_i) - \gamma Q(s_{i+1},\pi(s_{i+1})) - r_i)\frac{d}{d\omega}h(s_i,a_i) \tag{4}$$

$$\Delta\psi = -\sum_{i=1}^{l}\frac{d}{\epsilon d\psi}\pi(s_{i+1})\frac{\epsilon d}{d\pi(s_{i+1})}Q(s_{i+1},\pi(s_{i+1})) \tag{5}$$

$$= -\sum_{i=1}^{l}\frac{d}{d\psi}Q(s_{i+1},\pi(s_{i+1}))$$

$\omega$ here are the corresponding parameters, which describe the auxiliary function h, which is modeled as a feed-forward network, $0\leq\beta\leq 1$ serves to control the influence of the auxiliary function h and $\alpha\geq 1$ is the extent of the optimization of h compared with Q. $\psi$ represents the parameter of a feed-forward network $\pi$ (FIG. 1), which is used to model the optimum selection rule. Instead of this modified Bellman residual $L_{aux}$ it is also possible to use the standard Bellman residual or the reaching of the fixed point of the Bellman equation to resolve the optimization problem. The above equation (4) is then no longer required and the term starting with the factors $\beta\rho\gamma$ no longer occurs in the equation (3). The parameter $\beta$ also allows a gradual transition. The optimality criterion according to the conventional minimalization of the Bellman residual is then obtained for $\rho=1$, while the reaching of the fixed point of the Bellman iteration is obtained for $\rho=0$.

In the embodiment described here the function h is achieved in the architecture according to FIG. 1 by inserting the auxiliary network AN next to the main network MN. The auxiliary network AN models the function h with a neural network, which like the network N(s,a) has an input layer I comprising the state s and the action a, a hidden layer H and an output layer O comprising the function h. The auxiliary network AN performs two tasks: it maximizes $\hat{L}$ in relation to $\theta$ and minimizes $\hat{L}$ in relation to $\omega$. The main network MN and the auxiliary network AN here are learned simultaneously.

The architecture of the main network MN shown in FIG. 1 shows the policy gradient regression used in the invention. The main network MN consists of a left part, which models the quality function Q as an individual neural network N(s,a). The states s and the actions a are continuous here. The left part of the network is coupled to the right part by way of the reward function R, with the gradient flow being controlled by the parameters $-\gamma$ and $\rho$, which occur in the above gradient equation (3). In the right part of the main network MN in branches 1 and 2 is the optimum action selection rule P in the form of the neural network $\pi$ with corresponding parameters $\psi$ and the neural network N(s',a') for the sequential state. The parameters $\psi$ of the neural network $\pi$ are learned in respect of the optimum selection rule P. The optimum selection rule here is the maximization of the quality function Q. V' in FIG. 1 standards for $V(s')=Q(s',\pi(s'))$ and reflects the maximum Q function for the sequential state s' and the sequential action a'. The branch 2 of the right part of the main network MN shows the maximization of the Q function in respect of the $\epsilon$ term according to the above equation (5). A sufficiently small $\epsilon$ allows the rule P only to contribute to the maximization of the Q function.

Therefore according to FIG. 1 a method results, in which an individual neural network N(s,a) is used for continuous states s and actions a. For the sequential states $Q(s',\pi(s'))$ is calculated, in which process it is assumed that $\pi: S\to A$ with the parameters $\psi$ tends to implement the optimum rule P, in other words to maximize the Q function. Therefore $Q(s',\pi(s'))$ is in proximity to $\max_a Q(s',a')$. This is achieved by maximizing the Q function for the sequential states at the same time as the regression in respect of the rewards. A type of Batch On-Policy-Iteration or a Batch Actor-Critic-Iteration is thus implemented, in which the intrinsic interaction between the Q function and the rule P is used. The gradient flow control technique known from the prior art is used here in conjunction with shared weights, this technique being sufficient to construct the appropriate architecture. In the network element for the sequential state shown in FIG. 1 with the reference character 1 the gradient flow through the network is cut off, as shown by the number 0 at the dashed arrow pointing to the action a'. The rule P therefore does not influence the regression in respect of the rewards. In an extended network element, shown in FIG. 1 with the reference character 2, a sufficiently small allows just the rule P to contribute to the maximization of the Q function. A backpropagation method with shared weights known sufficiently from the prior art is used to calculate the optimum selection rule $\pi$. The gradient backflow blocking technique is also used, having been developed by the inventors and already published. The gradient backflow blocking technique is thus part of the prior art and is sufficiently known to those skilled in the art. It is therefore not described in more detail here. After the convergence of the backpropagation method the optimum selection rule can be determined with the aid of the feed-forward network $\pi$, without using the Q function as an interim result.

The method described above does not take into account the history of past states, which means that the mode of operation cannot be guaranteed, if there is no Markov decision process. In a second embodiment of the inventive method this history can be taken into account however. This is done by generating the data record, which is used to learn the neural networks, itself in turn from a source data record. The source data record here is the data record which is used directly in the embodiment in FIG. 1 to learn the neural networks. In the second embodiment, which is shown in FIG. 2, this source data record is used to model the dynamic behavior of the technical system with a recurrent neural network RNN, which comprises an input layer I', a hidden layer H' and an output layer O'. This neural network comprises the internal states $x_t$, $z_t$, $t\epsilon t-\tau, \ldots, t+1$ and the weighting matrices F, G, H, J. The transitions between the states are defined here by the following equations:

$$x_t = \tan h(Fs_t + Jz_{t-1})$$

$$z_t = Ga_t + Hx_t$$

A matrix M, which maps the internal onto the external state, can be used to achieve the sequential state by complying with the following condition:

$$\|Mz_t - s_{t+1}\|^2 = \min.$$

Known algorithms are used to determine the parameters of the recurrent neural network (i.e. the weighting matrices of the network) according to the above equations, such that the recurrent neural network generates the observed data records in the respective time point very efficiently. The recurrent neural network here is learned in turn using a backpropagation method known sufficiently from the prior art. Modeling of the dynamic behavior by means of the recurrent neural network RNN is sufficiently known to those skilled in the art and is therefore not described in detail here. In contrast to the method in FIG. 1 the hidden states $x_t$ and $x_{t+1}$ are now included as input variables in the input layer I instead of the states s and s'. Otherwise the learning method in FIG. 2 corresponds to the learning method in FIG. 1, which can be seen from the fact that the part above the recurrent neural network RNN is identical to FIG. 1. No further description of the learning of the neural networks will therefore be given. A further parameter µ is included in the recurrent neural network according to FIG. 2, being used to adjust the learning rate of the recurrent neural network compared with the learning rate of the individual feed-forward networks. Matrices M are also used, these being described in more detail below.

The architecture shown in FIG. 2 allows only one recurrent neural network to be used both for the Q function and for the value function. The recurrent neural network here is able to approximate a deterministic dynamic system with any accuracy, which is however not possible for a stochastic dynamic system. However this does not represent any restriction, as the structure of the internal hidden state can be considered as a transformation to an appropriate feature space for the stochastic reinforcement learning method by the feed-forward networks. In the deterministic instance this feature space is identical to the exact description of all information, which determines the future, while in the general stochastic instance the internal state must be generated such that the expected future is predicted. Therefore in the recurrent neural network in FIG. 2 an autonomous future element is used, when internal states are predicted without observations from the Markov process. In FIG. 2 these are the states $x_t$ for $t > i+1$ and the following applies:

$$x_t = \tan h(Nz_{t-1}), t > i+1.$$

This is sufficient, as the Markov characteristic can be reconstructed by means of the knowledge of the expected future states. The recurrent architecture according to FIG. 2 as described above allows the automatic reconstruction of an underlying Markov process of any order in principle. The user of the inventive method can thus utilize more information from the data and has to provide less expert information.

The embodiments according to FIG. 1 and FIG. 2 of the inventive method described above have been tested based on problems known from the prior art. It has proved in this process that the method furnishes good results. In particular the method was also compared with the method according to publication [1], in which process it proved possible to achieve better results with the inventive method.

The method described in the foregoing offers an information-efficient solution for general optimum control problems in any technical fields, it being possible to overcome even complex control problems with few available data records, such problems having proved impossible to resolve satisfactorily with conventional methods.

Bibliography

[1] German patent application 10 2007 017 259.3
[2] Andras Antos, Csaba Szepesvari, Remi Munos. Learning near-optimum policies with Bellman-residual minimization based fitted policy iteration and a single sample path. In Proc. of the Conference on Learning Theory, pages 574-588, 2006.

The invention claimed:

1. A method for computer-aided control of a technical system, comprising:
   characterizing a dynamic behavior of the technical system for a plurality of time points by a state of the technical system and an action carried out on the technical system for each time point, wherein an action at a time point results in a sequential state of the technical system at a next time point;
   learning an action selection rule with a plurality of data records, wherein each data record comprises the state of the technical system at the time point, the action carried out in the state and the sequential state, and wherein an evaluation is assigned to each data record, the learning of the action selection rule comprising:
      modeling of a quality function by a first neural network comprising the states and actions of the technical system as parameters;
      learning the first neural network based on an optimality criterion, which is a function of the evaluations of the data records and the quality function, an optimum action in respect of the quality function being modeled by a second neural network, which is learned based on the quality function; and
   controlling the technical system such that the actions to be carried out on the technical system are selected using the action selection rule based upon the second neural network.

2. The method as claimed in claim 1, wherein the quality function is modeled by the first neural network such that an evaluation function is tailored to the evaluations of the data records.

3. The method as claimed in claim 1, wherein the optimum action in respect of the quality function is the action which maximizes the quality function.

4. The method as claimed in claim 1, wherein the first neural network forms a feed-forward network with an input layer comprising a respective state of the technical system and the action to be carried out in the respective state, one or more hidden layers and an output layer comprising the quality function.

5. The method as claimed in claim 1, wherein the second neural network forms a feed-forward network with an input layer comprising a respective sequential state of the technical system, one or more hidden layers and an output layer comprising the optimum action in the sequential state in respect of the quality function.

6. The method as claimed in claim 1, wherein a backpropagation method is used to learn the first neural network and the second neural network.

7. The method as claimed in claim 1, wherein the optimality criterion is selected such that an optimum dynamic behavior of the technical system is parameterized.

8. The method as claimed in claim 1, wherein the optimality criterion is the minimization of the Bellman residual.

9. The method as claimed in claim 1, wherein the optimality criterion is the reaching of the fixed point of the Bellman iteration.

10. The method as claimed in claim 1, wherein the optimality criterion is the minimization of a modified Bellman residual, the modified Bellman residual comprising an auxiliary function, which is a function of the state of the technical system and the action to be carried out in the respective state.

11. The method as claimed in claim 10, wherein the auxiliary function is modeled by a third neural network, which is learned based upon the optimality criterion, the third neural network forming a feed-forward network with an input layer comprising a respective state of the technical system and the action to be carried out in the respective state, one or more hidden layers and an output layer comprising the auxiliary function.

12. The method as claimed in claim 1, wherein the optimality criterion comprises an adjustable parameter, and wherein the optimality criterion is adapted based upon a change of the adjustable parameter.

13. The method as claimed in claim 1, wherein a state of the technical system comprises one or more variables, in particular observed state variables of the technical system.

14. The method as claimed in claim 1, wherein an action to be carried out on the technical system comprises one or more action variables.

15. The method as claimed in claim 1, wherein the states are states of the technical system hidden in the data records, which are generated by a recurrent neural network with the aid of source data records, the source data records respectively comprising an observed state of the technical system, an action carried out in the observed state and the resulting sequential state.

16. The method as claimed in claim 15, wherein the dynamic behavior of the technical system is modeled by the recurrent neural network, the recurrent neural network being formed by at least one input layer comprising the observed states of the technical system and the actions carried out on the technical system, at least one hidden recurrent layer comprising the hidden states and at least one output layer comprising the observed states of the technical system.

17. The method as claimed in claim 16, wherein the recurrent neural network is learned using a backpropagation method.

18. The method as claimed in claim 1, wherein the technical system is a gas turbine.

19. The method as claimed in claim 18, wherein the method is used to control a gas turbine, the states of the technical system and/or the actions to be carried out in the respective states comprising one or more of the following variables:
gross output of the gas turbine;
one or more pressures and/or temperatures in the gas turbine or in the area around the gas turbine;
combustion chamber accelerations in the gas turbine; and
one or more adjustment parameters at the gas turbine, in particular valve settings and/or fuel ratios and/or preliminary vane positions.

20. A non-transitory computer readable medium storing a program code for implementing a method for computer-aided control of a technical system when the program is running on a computer, the method comprising:
characterizing a dynamic behavior of the technical system for a plurality of time points by a state of the technical system and an action carried out on the technical system for each time point, wherein an action at a time point results in a sequential state of the technical system at a next time point;
learning an action selection rule with a plurality of data records, wherein each data record comprises the state of the technical system at the time point, the action carried out in the state and the sequential state, and wherein an evaluation is assigned to each data record, the learning of the action selection rule comprising:
modeling of a quality function by a first neural network comprising the states and actions of the technical system as parameters;
learning the first neural network based on an optimality criterion, which is a function of the evaluations of the data records and the quality function, an optimum action in respect of the quality function being modeled by a second neural network, which is learned based on the quality function; and
controlling the technical system such that the actions to be carried out on the technical system are selected using the action selection rule based upon the second neural network.

* * * * *